United States Patent [19] [11] 3,652,128
Schwarz [45] Mar. 28, 1972

[54] HEAD AND NECK REST

[72] Inventor: Bernhard Schwarz, Eichenstrasse 11, Muri, Berne, Switzerland

[22] Filed: Jan. 20, 1970

[21] Appl. No.: 4,346

[30] Foreign Application Priority Data

Jan. 23, 1969 Switzerland ............................ 1155/69

[52] U.S. Cl. ............................................. 297/408, 297/216
[51] Int. Cl. .............................................................. A47c 7/36
[58] Field of Search ................ 297/397, 406, 405, 408, 409, 297/404, 216; 248/391, 181

[56] References Cited

UNITED STATES PATENTS

| | | | |
|---|---|---|---|
| 344,726 | 6/1886 | Dolton | 297/409 |
| 852,872 | 5/1907 | Collins | 248/181 X |
| 1,746,091 | 2/1930 | Skidmore | 297/409 X |
| 1,821,560 | 9/1931 | May | 297/409 X |
| 1,869,984 | 8/1932 | Sklarek | 248/181 X |
| 2,632,497 | 3/1953 | Brady | 297/409 X |
| 2,652,101 | 9/1953 | Samsky | 297/409 X |
| 2,661,050 | 12/1953 | Felter | 297/391 |
| 2,666,476 | 1/1954 | Lycan | 297/410 X |
| 3,159,427 | 12/1964 | Lawson | 297/410 |
| 3,014,761 | 12/1961 | Otto | 297/409 X |

Primary Examiner—Francis K. Zugel
Attorney—Littlepage, Quaintance, Wray & Aisenberg

[57] ABSTRACT

A head and neck rest for vehicle seats comprises a head piece secured to a supporting rod which is mounted by the intermediary of an articulated joint on a saddle or supporting frame on the back rest of a seat. The joint allows a pivoting or tilting movement of the head piece and its supporting rod. A clamping rod traverses the joint and is arranged for exerting a predetermined clamping force on the members of the joint for controlling the tilting movement of the head piece due to the action of a shock received by the head or neck of a passenger, for example when the vehicle is hit in the rear by another vehicle driving in the same direction.

4 Claims, 4 Drawing Figures

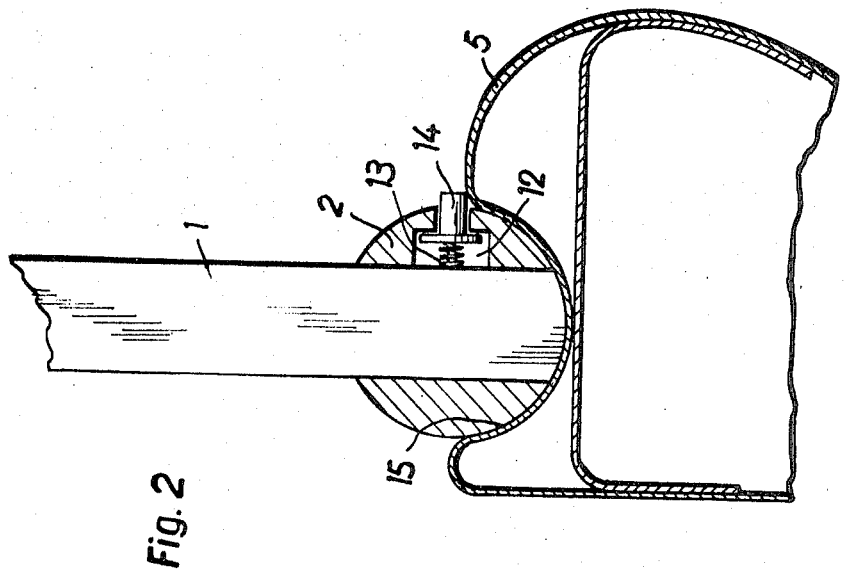
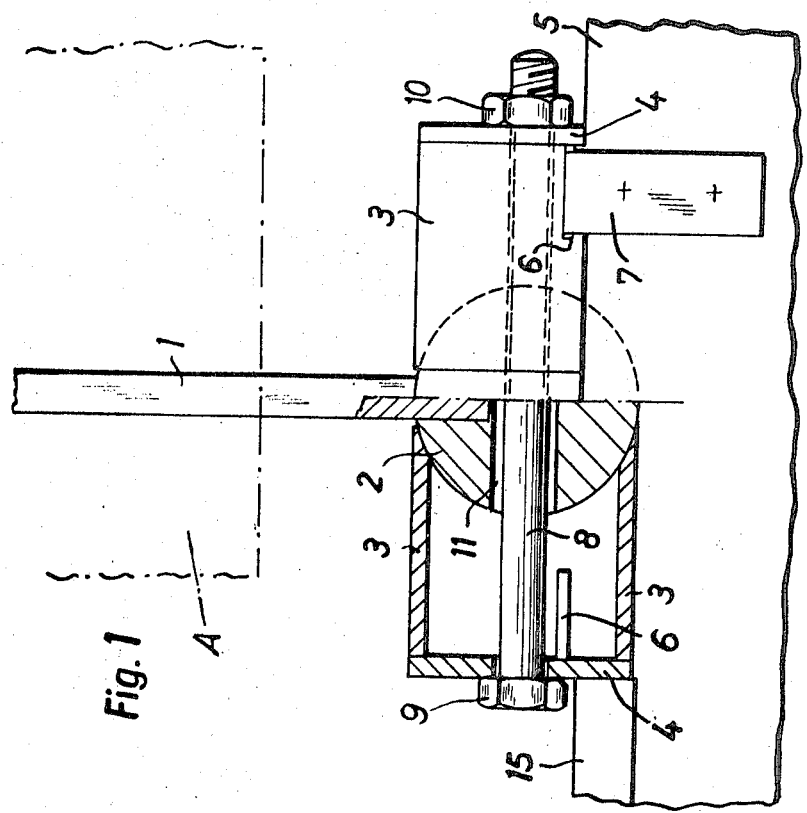

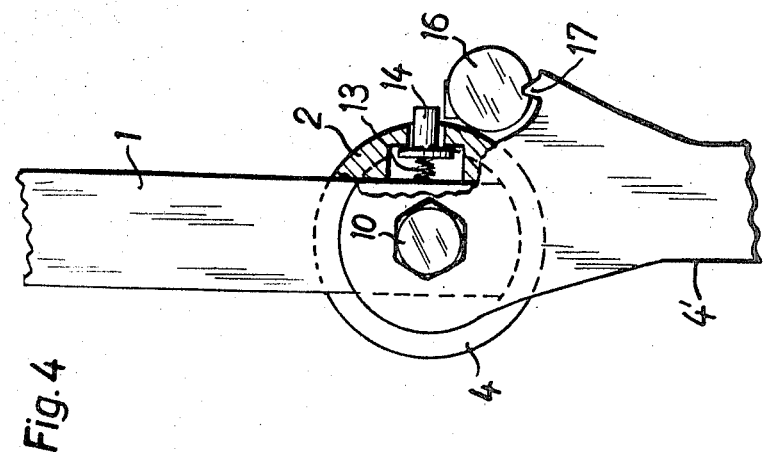
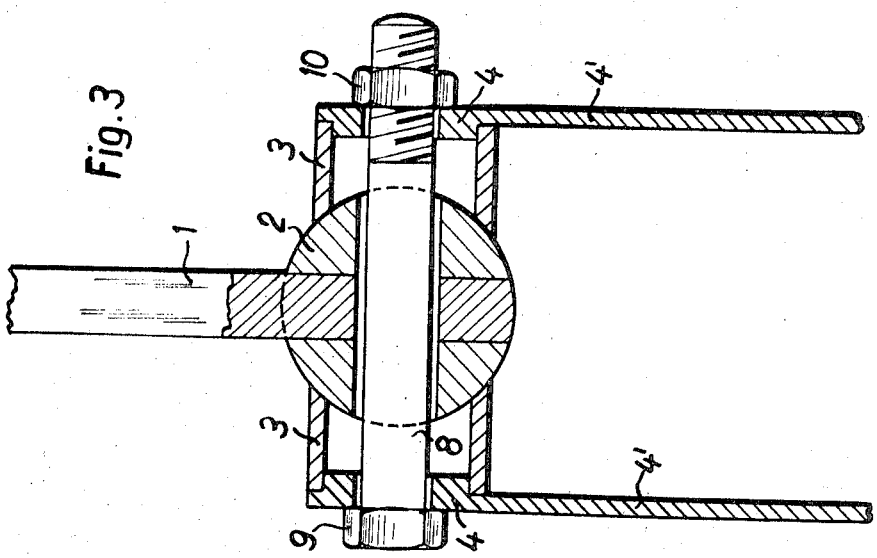

HEAD AND NECK REST

This invention relates to a head and neck rest which is particularly suitable for automobile and airplane seats.

There are known constructions of head rests for automobile seats which have a ball-and-socket joint. In such a construction the ball is urged by a spring into an upwardly open spherical recess in the casing of the joint. A blocking of the joint is not provided. This construction provides comfort but no safety for the user. Safety would require that the head rest can be so adjusted that upon shocks, particularly when a collision of cars occurs, the head rest affords a firm support up to certain limits, but beyond these limits it shall effectively yield.

Upon a collision of two cars driving in the same direction, the front car hit in the rear will be instantaneously accelerated. Thereby the head of an occupant of the front car is violently thrown backwards, the neck is subjected to a so-called whipping effect which often may cause dangerous injury.

It is an object of the present invention to provide a head and neck rest which can be arrested in its operative position, so that when it is used for automobile or airplane seats, it affords the required safety and effectively protects the head and the cervical vertebrae from injury. A shock shall not be hard to the neck, but shall be braked and absorbed with dissipation of kinetic energy.

According to the invention, the head or neck rest comprises a head piece, supporting means for mounting the head piece on the back rest of a seat, coacting movable and fixed joint members for pivotally connecting said head piece to said supporting means and arranged to allow a tilting movement of the head piece relative to the seat, and clamping means for exerting a predetermined clamping force on said movable and fixed joint members.

The invention will now be described with reference to the drawings illustrating two embodiments of a head and neck rest.

FIG. 1 is a diagrammatic representation of the first embodiment, the joint being mounted on a saddle destined to be placed over the back rest of a seat, FIG. 2 shows in vertical section a lock for limiting the pivoting range of a joint.

FIG. 3 shows the second embodiment destined to be inserted into the back rest of a seat.

FIG. 4 shows the lock for the joint of the embodiment according to FIG. 3.

FIG. 1 represents a part of a head and neck rest adapted to be placed over the seat back of an automobile seat. The head piece A of the rest is connected by means of a rod 1 with a ball 2 forming the movable part of a spherical joint. The rod 1 is fixed in the ball 2. The fixed part of the joint is formed by two tubes 3 having the two ends thereof facing each other formed to fit the surface of the ball to be received therebetween. The outer end faces of the two tubes 3 are closed each by a disc 4. The tubes 3 are fixed in axial alignment with one another to a saddle 5 of the head rest, the common axis of the tubes extending transversely to the longitudinal axis of the rod 1. The two tubes are arranged to be able to effect a small axial movement. For this purpose the wall of each tube 3 is provided with two axial slits 6 extending inwardly from the outer end faces of the tubes. Only one slit 6 is visible in FIG. 1, the second slit being at the rear side of the tube at the same level. A strap 7 of U-shape is passed through each pair of slits 6 and both ends of the straps 7 are attached to the saddle 5. As may be seen in FIG. 1, the width of the strap 7 is slightly smaller than the length of the slits 6 to enable a small axial displacement of the tubes 3.

The possibility of axial adjustment of the tubes 3 allows to press the parts of the joint, i.e., the ball 2 and the tubes 3 against each other by a predetermined force to produce a restraint or braking action of the pivotal movement of the rod 1 and accordingly of the head rest. For this purpose, clamping means are provided and consist of a clamping rod 8 in the form of a screw bolt traversing the joint. The screw bolt is supported at both ends of the joint by the screw head 9 and clamping nut 10, respectively. In order to provide mobility of the ball 2 in all directions, the diameter of the central bore 11 of the ball receiving the clamping rod 8 must be greater than the diameter of the rod 8. If it is desired that in certain positions of pivotal movement of the head rest a surface contact shall be established between clamping rod and ball, the bore of the ball can be so shaped that it conically tapers from both sides of the ball towards the center thereof. By tightening the clamping nut 10 with a predetermined torque the tubes 3 are applied with a corresponding force against the ball 2. Thus the head rest can be arrested in a preselected position which is continuously variable. When a force is exerted on the head rest, which exceeds the arresting force, as this may be caused by a violent shock of the head of a person using the seat when the automobile is hit from the back, the joint yields and the rod 1 is braked and is pivoted in the direction of the force acting on the head rest, while consuming energy.

It is convenient to provide a locking means as an additional safety provision to prevent the rod 1 from effecting an undesired backwards pivoting movement beyond a determined angular position. FIG. 2 shows an example of such a locking means which comprises a bolt 14 engaged in recess 12 of the ball 2 and supported by a spring 13. The bolt 14 slightly projects beyond the periphery of the ball 2 and abuts against the upper edge of the saddle 5. The bolt 14 and the place of its abutment preferably consist of a material which, when subjected to a violent shock, will deform while consuming or dissipating energy. Also, in the last phase of movement of the head rest produced by a violent shock, the rest, accordingly, is still braked and energy is dissipated, i.e. the head of a person using the seat does not strike against a rigid resistance. Modern automobiles are provided with so-called rubber zones in front of and behind the passenger compartment, in order that upon accidents, a large proportion of the energy of the shock is dissipated by deformation of structural material. The same idea applies also in the present case. The rod 1 only then can effect a further backwards rocking movement when the resistance of the bolt 14 is abolished. This latter may be pushed with the finger into the interior of the ball 2. The spring 13 takes care that the bolt 14 is again projected out of the recess 12 into its normal operative position. For reasons of safety it is important that the locking action occurs automatically as soon as the head rest is brought into a normal position of use, since a safety lock which operates automatically cannot be forgotten.

The described lock obviously could be so constructed that the bolt and spring are provided in or on the saddle or in the portion 15 thereof receiving the joint. Such a construction, however, requires that the ball 2 or the rod 1 would have to provide a resistance for the bolt 14, for example a corresponding notch or a projecting lug.

It is convenient and in many cases necessary to construct the head and neck rest in such manner that it can be tilted through an angle of 90° towards the back or towards the front. This will facilitate or enable passengers to enter and occupy the back seats in two-door automobiles where the entire front seats, not only the back rests, are to be tilted to give access to the back seats. As fixed, non tiltable head rest may abut against the top of the car when tilting the seat. When the front seat beside the driver remains free and back seats only are occupied, it is advantageous for the view of the passengers that the head rest on the front seat can be tilted downwardly. Also, when the driver alone occupies the car, he will tilt the head rest of the empty front seat rearwardly so that his view towards the side is not impaired, particularly when driving in town. The construction of a tiltable head rest accordingly also increases the driving safety.

In order to prevent injury to the neck in case of an accident, the provision of a fixed turning lock would suffice. For the reasons indicated above, it is, however, preferred to be able to suspend the locking action.

The described construction offers the great advantage that arresting or braking the pivoting movement of the movable members of the joint, i.e., of the ball 2 and the rod 1, is effected by inner forces only, since the clamping rod 8 is supported on the joint itself. Therefore no forces result which would act outwardly on the saddle 5 or on the back rest of the seat, and which would have to be absorbed by heavy bearing structures. Accordingly, arresting of the ball 2 and of the rod 1, as well as of the head portion fixed to the rod, with respect to the saddle 5 to be secured to the back rest of the seat, occurs by a flux of force through the parts 2, 3, 4, 8, 9 and 10 which may be formed as rigid members, and an exactly adjustable and permanent arresting force will be obtained. For this reason, the saddle 5 can be made of light weight material, e.g. sheet material. At its top portion the saddle is provided with a half-cylindrical trough-shaped channel 15 receiving the joint members 2, 3 and 4.

It will be understood that various modifications of the described head rest construction are possible. For example, the joint can be made as a single axis joint having a disc, a cylinder, a cone or an ellipsoid as movable joint portion. For clamping the joint parts together, the clamping rod 8 can cooperate with a toggle lever of eccentric lever mechanism instead of a clamping nut, this mechanism being supported on the one hand on the clamping rod 8 and on the other hand on the fixed joint part.

FIG. 3 represents a joint which is basically the same as that shown in FIG. 1, but the disc 4 are provided with a downwardly directed extension 4' serving for insertion into the back rest of a seat. The back rest obviously must be provided with corresponding means for receiving the extensions 4.

It would also be possible to permanently secure the extensions 4' of the disc 4 to the back rest, but it is more advantageous to make the head rest removable from the back rest of the seat. In seats in which the back rest can be tilted down to form a sleeping couch together with the seating portions of the front and back seats, it would not be possible to have permanently secured head rests on the front seats.

Removable head rest means that the joint together with the head piece support can be pulled out of the back rest of the seat, or that the joint is firmly secured to the back rest and the head piece with the supporting rod 1 may be removed from the joint. It is important that a simple manipulation only is required for a safe coupling of the removable parts from the back rest. The coupling may not be dependent on screws, buttons or levers the actuation of which could be effected improperly or forgotten.

FIG. 4 represents the locking device of an insertable head rest according to FIG. 3. The place of abutment of the bolt 14 is situated on a frame member 16 of the back rest of the seat. The abutment could also be formed by a transverse connecting member of correspondingly formed portions 4'.

In the example according to FIGS. 3 and 4, a projection 17 engages a corresponding recess of the frame member 16. Obviously also other anchoring methods are possible.

The economical advantage of the head rest according to the invention will be recognized from the drawings. The construction is extremely simple and its manufacture is relatively cheap. The movable joint portion may be made by a casting method, and when the ball is made in two symmetrical portions, the recesses for the clamping rod 8, the rod 1 and the locking means 13, 14 can be produced in a single operation when using a corresponding casting mold. The two symmetrical portions of a movable joint part, for example of the bolt 1 are firmly pressed together by the other members of the joint 3, 4, 8, 9, 10 whereby the rod 1 is securely clamped in the movable part.

I claim:

1. A head and neck rest, particularly for automobile or airplane seats, having a back rest, comprising a head piece, a rod having a first end connected to the head piece and rigidly fixed thereto against rotation therewith, and extending downward therefrom, supporting means for mounting said head piece rod to the back rest of the seat, coacting rotatably movable and stationary joint members rigidly connected to the supporting means for pivotally connecting said head piece rod to said supporting means, said movable joint member comprising a spherical element fixedly receiving a second end of the rod and centrally positioned between the stationary joint members and arranged to allow a tilting movement of the head piece rod, wherein said movable member is spherical and wherein said stationary members are cylindrical and terminate inwardly in spheroidal edges, whereby said movable and stationary joint members abut against one another along linearly spherical surfaces, and a clamping rod traversing the joint members with clearance and connected to the stationary joint members for exerting a predetermined inward clamping force on said said movable member by said stationary joint members and clamping said movable member, rod and head piece to resist rotation in the stationary members.

2. A head and neck rest according to claim 1, in which a blocking device which extends outward from the movable member is provided for limiting the pivotal movement of said head piece by engaging the supporting means.

3. A head and neck rest according to claim 2, in which said blocking device comprises energy dissipating destruction members.

4. A head and neck rest according to claim 2, in which said blocking device is movable inward in the movable member whereby the device may be rendered inoperative.

* * * * *